United States Patent
Rase

[11] Patent Number: 4,647,327
[45] Date of Patent: Mar. 3, 1987

[54] PROCESS OF FORMING MULTI-PLAY LAMINATES

[75] Inventor: Jean Rase, Charleroi, Belgium

[73] Assignee: Glaverbel, Brussels, Belgium

[21] Appl. No.: 697,427

[22] Filed: Feb. 1, 1985

Related U.S. Application Data

[63] Continuation of Ser. No. 490,163, Apr. 29, 1983, abandoned.

[30] Foreign Application Priority Data

Apr. 30, 1982 [GB] United Kingdom ............... 8212669

[51] Int. Cl.$^4$ .................................... B32B 31/00
[52] U.S. Cl. .................................... 156/87; 156/103; 156/104; 156/382
[58] Field of Search ............... 156/103, 104, 83, 87, 156/382

[56] References Cited

U.S. PATENT DOCUMENTS

| | | | |
|---|---|---|---|
| 3,852,136 | 12/1974 | Plumat et al. | 156/104 |
| 4,175,162 | 11/1979 | De Boel et al. | 156/103 |
| 4,362,587 | 12/1982 | Baudin et al. | 156/104 |

FOREIGN PATENT DOCUMENTS

| | | |
|---|---|---|
| 2006655 | 9/1970 | Fed. Rep. of Germany . |
| 2431922 | 2/1980 | France . |
| 885,131 | 12/1961 | United Kingdom . |
| 976317 | 11/1964 | United Kingdom . |
| 1116334 | 6/1968 | United Kingdom . |
| 1306502 | 2/1973 | United Kingdom . |
| 1382186 | 1/1975 | United Kingdom . |
| 1,413,770 | 11/1975 | United Kingdom . |
| 1504198 | 3/1978 | United Kingdom . |
| 1604872 | 12/1981 | United Kingdom . |

Primary Examiner—Tim Miles
Assistant Examiner—Timothy W. Heitbrink
Attorney, Agent, or Firm—Spencer and Frank

[57] ABSTRACT

A process of forming a multi-ply laminate which comprises at least one ply 2 of thermoplastics material forming a transparent outer ply of the laminate, such process comprising assembling the plies 1, 2 of the laminate, degassing its inter-ply space or spaces and subjecting it to bonding conditions including environmental laminating pressure distributed over the outside of the or each said thermoplastics outer ply 2 by a moulding plate 3 is characterised by the steps of:

enveloping at least the edges of the assembled laminate plier 1, 2 and moulding plate(s) 3 by means 4 defining therewith an edge space 5 in communication with the inter-ply space(s), reducing the pressure P5 within the edge space 5 to commence degassing of the assembly and heating the assembly (curve T) while the main faces of the assembly are subjected to at least atmospheric environmental pressure P6 and subsequently, while the assembly is subjected to environment laminating pressure P6 raising the edge pressure P5 to reduce or eliminate any difference between the edge pressure P5 and the environmental laminating pressure P6 before the assembly reaches its maximum temperature T, and continuing to heat the assembly and maintaining environmental laminating pressure P6 to complete bonding of the laminate plies.

12 Claims, 2 Drawing Figures

PROCESS OF FORMING MULTI-PLAY LAMINATES

BACKGROUND OF THE INVENTION

This invention relates to a process of forming a multi-ply laminate which comprises at least one ply of glass and at least one ply of thermoplastics material forming an outer ply of the laminate, such process comprising assembling the plies of the laminate, degassing its inter-ply space or spaces and subjecting it to bonding conditions including environmental laminating pressure distributed over the outside of the or each said thermoplastics outer ply by a moulding plate.

Such laminates can be used for various purposes, but commercially the most important use probably lies in te field of glass/plastics laminates used as lights for motor vehicles, especially windscreens. Windscreens in which a said thermoplastics ply is exposed to the interior of the vehicle can have a combination of properties which is highly desirable for affording protection to vehicle occupants against laceration by glass fragments in the event of the windscreen being broken for example by impact of an occupant's head against the screen.

It will be apparent that such a product should be as optically perfect as is consistent with a commercially viable sales price.

Laminates of the form to which the invention relates are of potential value for other purposes, for example as interior or exterior glazings in buildings or other structures. The invention is also useful in the manufacture of opaque products, for example mirrors, especially those of the type in which a reflective layer is sandwiched between a glass sheet and a thermoplastics sheet of which one is tinted so as to afford different reflective properties according to the side from which the mirror is viewed.

Laminates of the said form include laminates having only two plies and also laminates having three or more plies. One or both outer plies may be of thermoplastics material. The laminate may include one, or more than one, glass ply, e.g. it may include a sub-laminate comprising two sheets of glass bonded together by means of a thermoplastics interlayer.

Plastics and glass plies of the laminate can be bonded by activating the thermoplastics with or without the use of an adhesion promoter or by means of an adhesive.

In order to avoid the entrapment of air between the plies of the laminate during its bonding, the assembled plies are subjected to a degassing step in order to remove any air from the inter-ply space. The entrapment of such air would lead to non-uniform bonding and would also be a cause of optical defects.

After degassing has commenced, the assembly is subjected to bonding conditions including heat and laminating pressure exerted on the outer main faces of the assembled plies.

It has been found that the manner in which such an assembly has hitherto been subjected to bonding conditions is a cause of non-parallelism of the outer faces of the laminate around the margin thereof thus leading to distortion of objects viewed through such margin. It is an object of the present invention to go at least some way towards remedying this defect.

SUMMARY OF THE INVENTION

According to the present invention, there is provided a process of forming a multi-ply laminate which comprises at least one ply of glass and at least one ply of thermoplastics material forming a transparent outer ply of the laminate, such process comrising assembling the plies of the laminate, degassing its inter-ply space or spaces and subjecting it to bonding conditions including environmental laminating pressure distributed over the outside of the or each said thermoplastics outer ply by a moulding plate, characterised by the steps of:

enveloping at least the edges of the assembled laminate plies and moulding plate(s) by means defining therewith an edge space in commumication with the inter-ply space(s).

reducing the pressure (hereinafter called "edge pressure") or "edge" space pressure within said edge space to commence degassing of the assembly and heating the assembly while the main faces of the assembly are subjected to at least atmospheric environmental pressure, and subsequently, while the assembly is subjected to environmental laminating pressure, raising said edge pressure to reduce or eliminate and difference between said edge pressure and said environmental laminating pressure before the assembly reaches its maximum temperature and, continuing to heat the assembly and maintaining environmental laminating pressure to complete bonding of the laminate plies.

The present invention is based on the discovery that a major cause of non-parallelism of the outer faces of the laminate around its margin is plastic flow of the thermoplastic material which has been softened by heating due to an excessive differential between the pressure on the main faces of the assembly and pressure on its edges during bonding. By operating in accordance with this invention, such non-parallelism is reduced and can, by suitable choice of bonding and pre-bonding conditions, be substantially avoided.

The choice of bonding conditions, that is to say the level to which the temperature of the assembly is raised, the time during which the assembly is subjected to elevated temperature and laminating pressure and the level of the laminating pressure, will depend on the bond strength required between the or each thermoplastics outer ply and an adjacent ply of the laminate, and on the nature of the respective plies and any surface treatment applied. In any event, to ensure adequate bond strength it is generally necessary to heat such a thermoplastics outer ply to such an extent that it is considerably softer than when at room temperature. And it is when the thermoplastics material is so softened that it sis most vulnerable to plastics flow due to differences between the laminating pressure and the edge pressure. It is accordingly preferred that said raising of said edge pressure is effected before or when the assembly reaches a temperature at which effective adherence commences between the laminate plies.

The temperature at which effective adhesion will commence between a thermoplastics ply and an adjacent sheet is dependent on a large number of factors. Among these factors may be cited the following:

(i) the nature of the thermoplastics ply;
(ii) the nature of the adjacent sheet;
(iii) whether or not an adhesion promoting primer is used;
(iv) any other treatment.

Accordingly, we propose a test based on ASTM D 903-49 for determining the temperature at which effective bonding commences. A strip of the material for forming the thermoplastics ply is cut to 4 cm in width. This strip is then applied to a sheet of the material for forming the adjacent sheet of the ply, and a moulding plate is placed in contact with the other face of the thermoplastics ply. Any surface treatment to be used in the actual production process is also used in this test. The test assembly is then subjected to heat and sub-atmospheric edge pressure according to the schedules to be used in the manufacturing process of the invention, save that at the moment when the edge pressure would be raised, the test specimen is removed from the heat source and the apparatus used for subjecting it to reduced edge pressure. A light or ineffective bond may have developed between the thermoplastics strip and the adjacent sheet. The mould is removed and the laminate plies are placed on a support beneath a pair of rollers and an end of the thermoplastics strip is taken up between the rollers and placed in the jaws of the testing machine. The strip is then peeled away from the adjacent sheet at an angle of 90° against one of the rollers. This roller has a diameter of 28 mm. For the purpose of this specification, effective adherence is considered to commence at a peel strength of 25 g/cm.

Advantageously, said raising of said edge pressure is such as to equalise said edge pressure and said laminating pressure. This has the important effect of eliminating pressure differentials between the edge pressure and the laminating pressure, and is particularly easy to achieve, for example by placing the edge space surrounding the assembly in communication with the chamber in which laminating pressure is sustained.

In the most preferred embodiments of the present invention, said edge pressure is raised from a sub-atmospheric value to at least atmospheric pressure in a continuous step.

Said edge pressure is preferably reduced to an absolute value below 80 kPa so as to promote degassing. Such value may for example be below 60 kPa or even below 15 kPa.

For effective degassing, it has been found that the laminate assembly must be at elevated temperature while it is subjected to sub-atmospheric edge pressure in order that excess solvent and gases absorbed or adsorbed by the thermoplastic material and any primer applied to the sheet faces to be bonded may be sucked off. Such heating may commence before or at the same time as reduction in edge pressure, but it has been found that the best results are achieved when said edge pressure is reduced prior to the commencement of said heating as is preferred.

Advantageously, said laminating pressure is a super-atmospheric pressure. This is found to promote the formation of inter-ply bonding both because of the increased forces applied and because heat transfer from the pressure exerting medium to the laminate assembly is increased.

Preferably, said edge pressure is raised to a super-atmospheric pressure which subsists for the greater part of the period during which the heated laminate assembly is subjected to super-atmospheric laminating pressure. There is then a relatively short time during which a substantial difference subsists between the edge pressure and the laminating pressure.

To promote final bonding, said super-atmospheric laminating pressure is preferably raised to an absolute value of at least 700 kPa.

Also to promote final bonding, it is preferred that said assembly is heated to a temperature of at least 100° C. and is maintained at or above that temperature under environmental laminating pressure for at least 15 minutes. Such temperatures are effective for bonding such plastics materials as are principally used in the manufacture of vehicle windscreens.

The present invention includes a multi-ply laminate which has been formed by a process as herein defined.

BRIEF DESCRIPTION OF THE DRAWING

A preferred embodiment of the invention will now be described in greater detail with reference to the accompanying diagrammatic drawing in which.

DESCRIPTION OF THE PREFERRED EMBODIMENTS

Figure 1:
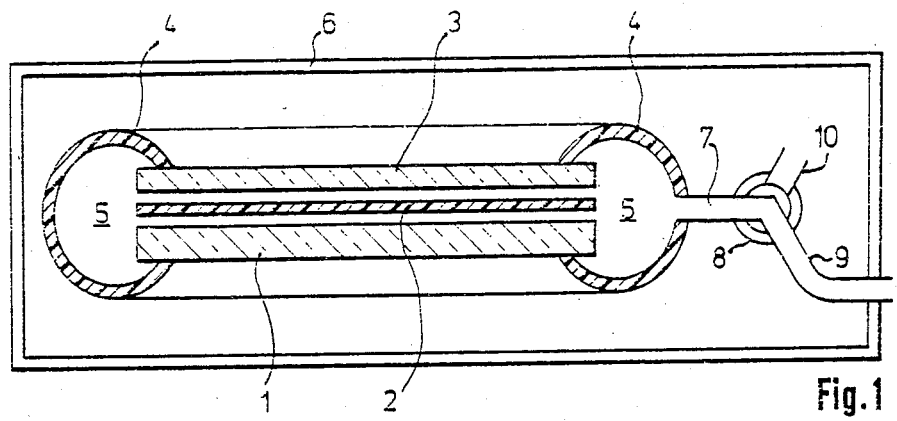
FIG. 1 is a schematic view of apparatus for performing the invention.

In FIG. 1, a laminate is to be formed of a single glass sheet 1 and a single thermoplastics ply 2. To this end, the glass sheet 1 and thermoplastics ply 2 are assembled and a mould plate 3 is laid over the thermoplastics ply. Of course additional thermoplastics and/or glass plies not shown may be incorporated between the glass sheet 1 and thermoplastics ply 2 if desired, and the glass sheet 1 illustrated may be constituted as a mould plate if it is desired to manufacture a laminate with two exposed thermoplastics plies.

The edges of the laminate and mould plate assembly 1, 2, 3 are enveloped by a slit tube 4 to define, with the edges of the assembly an edge space 5 and the whole is then placed in an autoclave 6. A tube 7 leads from the edge space 5 to a three-way valve 8 whence a vacuum line 9 leads to a vacuum pump which is not shown. A third part 10 of the three-way valve 8 communicates with the interior of the autoclave 6 or with another, external source of pressure. Means (not shown) is provided for heating the autoclave and for raising its internal pressure.

Figure 2:
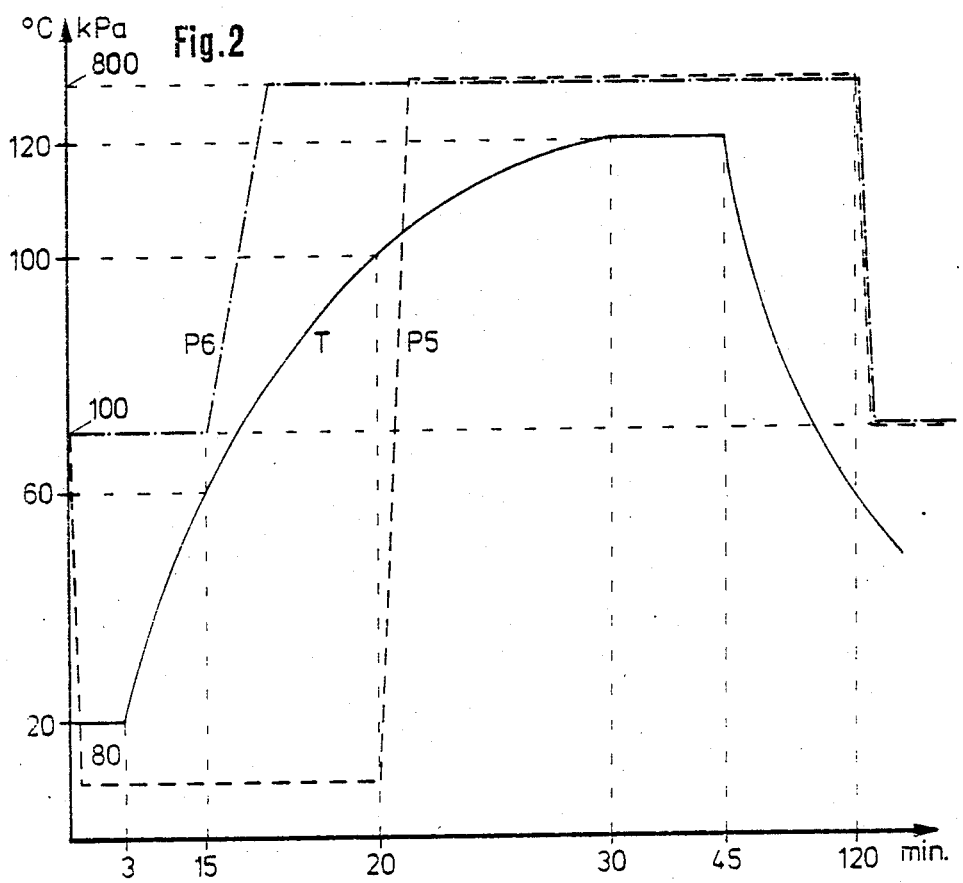
FIG. 2 is a graph showing temperature and pressure schedules to which a laminate assembly may be subjected when performing a process in accordance with the invention.

In a specific example of a process according to the invention a 0.6 mm film of plasticised polyurethane is bonded to a 3 mm sheet of float glass using the temperature and pressure schedule illustrated in FIG. 2. In this example, it had previously been ascertained that effective bonding between the polyurethane film 2 and the float glass sheet 1 commenced at a temperature of about 100° C.

After the laminate assembly had been placed in the autoclave 6, the vacuum pump was switched on to reduce the pressure P5 in the edge space 5 around the assembly from atmospheric pressure (100 kPa) to a sub-atmospheric pressure having an absolute value below 80 kPa. In fact the edge pressure P5 was reduced to about 13 kPa. This edge pressure reduction was accomplished in less than 1 minute. Three minutes after the commencement of edge pressure reduction, the autoclave heating means (not shown) was switched on so as to increase the temperature T of the laminate assembly progressively from ambient temperature (20° C.) to a maximum of 120° C. The actual rate of temperature increase will depend on the heating power of the autoclave and is not critical.

When the temperature of the laminate assembly had reached 60° C., the autoclave was pressurised to give a laminating P6 of 800 kPa absolute. This took place about 15 minutes after commencing reduction in edge pressure P5. Heating continued and the edge pressure P5 was increased when the laminate assembly had reached a temperature of about 100° C. This temperature was that which effective adherence commenced between the laminate plies.

At this stage, some twenty minutes after the edge pressure was first reduced, the three-way valve 8 was operated to place the edge space 5 in communication with the interior of the autoclave 6 so that the edge pressure P5 rose from its sub-atmospheric value to a super-atmospheric value, in fact equal to the super-atmospheric laminating pressure, in a single continuous step.

Super-atmospheric edge and laminating pressures P5, P6 were maintained at 800 kPa, and the assembly continued to be heated to 120° C. This maximum temperature was reached some thirty minutes after commencement of reduction in edge pressure, and it was maintained for a further fifteen minutes, whereafter the assembly was allowed to cool. After a further seventy five minutes, the temperature of the laminate assembly had dropped back to about 60° C., and the edge and laminating pressures were simultaneously allowed to return to atmospheric.

The laminate was then removed from the autoclave and stored overnight prior to inspection. The plies of the laminate were found to be firmly bonded together, and no surface deformation of the margin of the exposed thermoplastics ply was observed.

In another example, similar laminate-mould plate assemblies are enveloped by slit tubes and treated according to a different schedule. According to this schedule, the laminate assemblies were again heated to a temperature of 120° C., heating again commencing a few minutes after commencement of degassing, but the maximum temperature was not reached until forty five to sixty minutes after degassing began. This maximum temperature was maintained for about half an hour whereafter the laminate assemblies were allowed to cool. The environmental pressure acting on the main faces of the laminate-mould plate assemblies was again increased when the assembly temperature reached 60° C., but in this case to a level of about 1.3 MPa absolute. The degassing, edge pressure was reduced to below 80 kPa at the start of the process and was raised to equal the laminating pressure just before the assembly temperature reached the temperature (about 100° C.) at which effective adherence commenced between the plies of the laminates. These super-atmospheric pressures acting on the faces and the edges of the assemblies were maintained for a few hours after the assemblies began to cool whereafter they were returned to atmospheric and the laminates were removed, separated from the mould plates and found to be ready for use.

In a variant of the process, the environmental pressure acting on the main faces of the assemblies was maintained at atmospheric level throughout, and after degassing, the edge pressure was raised to that level.

I claim:

1. A process of forming a multi-ply laminate which comprises at least one ply or glass (1) and at least one ply (2) of thermoplastics material, the ply of thermoplastics material forming a transparent outer ply of the laminate, such process comprising assembling the plies (1, 2) of the laminate to create at least one inter-ply space between mutually adjacent plies, contacting the outer ply with a moulding plate (3) to form an assembly, said assembly having main faces, degassing the inter-ply space and subjecting the plies to bonding conditions including environmental laminating pressure distributed over the outside of the said thermoplastics outer ply (2) by the moulding plate (3), characterised by the steps of:
   enveloping at least the edges of the assembled laminate plies (1, 2) and moulding plate (3) by means (4) defining therewith an edge space (5) in communication with the inter-ply space,
   reducing the pressure (P5) within said edge space (5) to commence degassing of the assembly, and heating the assembly (curve T) while the main faces of the assembly are subjected to at least atmospheric environmental pressure (P6) subsequent to said step of reducing the edge space pressure, and while the assembly is subjected to environmental laminating pressure,
   raising said edge space pressure (P5) to reduce or eliminate any difference between said edge space pressure (P5) and said environmental laminating pressure (P6) before the assembly reaches its maximum temperature (T) and not later than the time when the assembly reaches a temperature at which effective adherence commences between the laminate plies, corresponding to a peel strength of 25 g/cm between the laminates plies, and
   continuing to heat the assembly and maintaining environmental laminating pressure (P6) to complete bonding of the laminate plies.

2. A process according to claim 1, wherein said step of raising said edge space pressure (P5) is such as to equalise said edge space pressure (P5) with said laminating pressure (P6).

3. A process according to claim 1, wherein said step of raising said edge space pressure is carried out from a sub-atmospheric value to at least atmospheric pressure in a continuous step.

4. A process according to claim 1, wherein said step of reducing said edge space pressure is carried out to an absolute value below 80 kPa.

5. A process according to claim 1, wherein said step of reducing said edge space pressure is carried out prior to the commencement of said step of heating.

6. A process according to claim 1, wherein said laminating pressure (P6) is a super-atmospheric pressure.

7. A process according to claim 6, wherein the laminate assembly is subject to sub-atmospheric laminating pressure during a selected time period and said step of raising said edge space pressure is carried out to a super-atmospheric pressure which subsists for the greater part of the period during which the laminate assembly is subjected to super-atmospheric laminating pressure (P6).

8. A process according to claim 6, wherein said super-atmospheric laminating pressure (P6) is raised to an absolute value of at least 700 kPa.

9. A process according to claim 1, wherein said step of heating said assembly is carried out by heating to a temperature (T) of at least 100° C. and maintaining at least that temperature under environmental laminating pressure for at least 15 minutes.

10. A process according to claim 1, wherein said step of continuing to heat the assembly and maintaining environmental pressure further comprises maintaining the edge space pressure at a value which reduces or eliminates and difference between that pressure and said environmental laminating pressure.

11. A process according to claim 10 wherein said step of maintaining the edge space pressure is carried out to maintain the edge space pressure substantially equal to said environmental laminating pressure.

12. A process according to claim 1, wherein the main faces of the assembly are subjected to at least atmospheric environmental pressure during the entire course of said process.

* * * * *